(12) United States Patent
Zimmerman et al.

(10) Patent No.: US 11,323,801 B2
(45) Date of Patent: *May 3, 2022

(54) DEVICE AND PROCESS FOR POWERING SMART SPEAKERS AND PROVIDING INTERNET CONNECTIVITY FOR THE SAME

(71) Applicant: TracFone Wireless, Inc., Miami, FL (US)

(72) Inventors: James Zimmerman, Miami, FL (US); Ricky Ramon, Miami, FL (US); Elliot Garcia, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,195

(22) Filed: Dec. 1, 2020

(65) Prior Publication Data
US 2021/0105560 A1 Apr. 8, 2021

Related U.S. Application Data

(63) Continuation of application No. 16/792,537, filed on Feb. 17, 2020, now Pat. No. 10,856,074, which is a
(Continued)

(51) Int. Cl.
*H04R 3/00* (2006.01)
*G06F 3/16* (2006.01)
(Continued)

(52) U.S. Cl.
CPC ............... *H04R 3/00* (2013.01); *G06F 3/167* (2013.01); *H04R 1/021* (2013.01); *H04R 1/025* (2013.01);
(Continued)

(58) Field of Classification Search
CPC ........... G06F 3/167; H04R 1/025; H04R 1/04; H04R 1/026; H04R 1/02; H04R 1/028;
(Continued)

(56) References Cited

U.S. PATENT DOCUMENTS 9,798,358 B1 10/2017 Skurdal
10,567,873 B2 * 2/2020 Zimmerman ............ H04R 3/00
(Continued)

*Primary Examiner* — Ahmad F. Matar
*Assistant Examiner* — Sabrina Diaz
(74) *Attorney, Agent, or Firm* — BakerHostetler

(57) ABSTRACT

A device configured to provide wireless service and power for a smart speaker includes at least one transceiver configured to wirelessly connect to a mobile broadband network and further configured to obtain internet access and the at least one transceiver further configured to wirelessly connect to the smart speaker and provide the internet access to the smart speaker. The device further includes a power supply configured to store power and the power supply further configured to provide power to the at least one transceiver. The power supply further configured to store power and the power supply further configured to provide power to the smart speaker. The device further includes a housing configured to house the at least one transceiver and the power supply.

20 Claims, 7 Drawing Sheets

Related U.S. Application Data continuation of application No. 16/047,345, filed on Jul. 27, 2018, now Pat. No. 10,567,873.

(60) Provisional application No. 62/537,791, filed on Jul. 27, 2017.

(51) Int. Cl.
*H04R 1/02* (2006.01)
*H04W 88/02* (2009.01)
*H04R 1/04* (2006.01)

(52) U.S. Cl.
CPC ............ *H04R 1/04* (2013.01); *H04R 2420/07* (2013.01); *H04W 88/02* (2013.01)

(58) Field of Classification Search
CPC .. H04R 2420/07; H04R 2420/09; H04R 3/00; H04W 88/02; H04W 88/00; H04W 88/08
USPC .......................................... 381/334, 332, 87
See application file for complete search history.

(56) References Cited

U.S. PATENT DOCUMENTS

| | | |
|---|---|---|
| 10,856,074 B2 * | 12/2020 | Zimmerman ........... G06F 3/167 |
| 2016/0196106 A1 | 7/2016 | Hammer et al. |
| 2016/0224064 A1 | 8/2016 | Fleisig |
| 2017/0316679 A1 | 11/2017 | Hess et al. |
| 2018/0234261 A1 | 8/2018 | Choi et al. |
| 2018/0359696 A1 | 12/2018 | Borean et al. |
| 2019/0200287 A1 | 6/2019 | Liu |

* cited by examiner

DEVICE AND PROCESS FOR POWERING SMART SPEAKERS AND PROVIDING INTERNET CONNECTIVITY FOR THE SAME

CROSS REFERENCE TO PRIOR APPLICATIONS

This application a continuation of U.S. patent application Ser. No. 16/792,537, filed Feb. 17, 2020, now U.S. Pat. No. 10,856,074 issued Dec. 1, 2020, which is hereby incorporated by reference in its entirety for all purposes as if fully set forth herein, which application is a continuation of U.S. patent application Ser. No. 16/047,345, filed Jul. 27, 2018, now U.S. Pat. No. 10,567,873 issued Feb. 18, 2020, which is hereby incorporated by reference in its entirety for all purposes as if fully set forth herein, which application claims the benefit of U.S. Provisional Patent Application No. 62/537,791 filed on Jul. 27, 2017, which is hereby incorporated by reference in its entirety for all purposes as if fully set forth herein.

BACKGROUND OF THE DISCLOSURE

1. Field of the Disclosure

The disclosure relates to a device and process for powering smart speakers and providing internet connectivity for the same. More particularly, the disclosure relates to a device and process for powering smart speakers and providing internet connectivity for the same so that the smart speaker may be operatively portable.

2. Related Art

Smart speaker devices have recently gained popularity and provide useful functionality for users in homes, workplaces, and the like. Such implementations of smart speaker devices connect to common wall outlets that provide nominal 120 V power to power the smart speaker. Moreover, such implementations utilize fixed Wi-Fi wireless access points having wired connections to the Internet implemented in homes, workplaces, and the like to provide Internet connectivity to the smart speaker devices. However, such implementations are limited to locations that have the above-noted power supply and Internet connectivity and accordingly the smart speakers are not operatively portable. In other words, when the smart speaker is not plugged in or able to access available Wi-Fi, the smart speaker does not provide full functionality.

Accordingly, a need exists to provide a device and process for powering smart speakers and providing internet connectivity for the same so that the smart speaker may be operatively portable.

SUMMARY OF THE DISCLOSURE

The foregoing needs are met, to a great extent, by the disclosure, providing a device and process for powering smart speakers and providing internet connectivity for the same so that the smart speaker may be operatively portable.

According to some aspects of the disclosure, a device is configured to provide wireless service and power for a smart speaker that includes at least one transceiver configured to wirelessly connect to a mobile broadband network and further configured to obtain internet access; the at least one transceiver further configured to wirelessly connect to the smart speaker and provide the internet access to the smart speaker; a power supply configured to store power and the power supply further configured to provide power to the at least one transceiver; the power supply further configured to store power and the power supply further configured to provide power to the smart speaker; and a housing configured to house the at least one transceiver and the power supply.

According to some aspects of the disclosure, a device used configured to provide wireless service and power for a smart speaker that includes at least one transceiver configured to wirelessly connect to a mobile broadband network and further configured to obtain internet access; the at least one transceiver further configured to wirelessly connect to the smart speaker and provide the internet access to the smart speaker; a processor configured to control the at least one transceiver; a power supply configured to store power and the power supply further configured to provide power to the at least one transceiver; the power supply further configured to store power and the power supply further configured to provide power to the smart speaker; and a housing configured to house the at least one transceiver, the processor, and the power supply.

According to some aspects of the disclosure, a device is configured to provide wireless service and power for a smart speaker that includes at least one transceiver configured to wirelessly connect to a mobile broadband network and further configured to obtain internet access; the at least one transceiver further configured to wirelessly connect to the smart speaker and provide the internet access to the smart speaker; a processor configured to control the at least one transceiver; a power supply configured to store power and the power supply further configured to provide power to the at least one transceiver; the power supply further configured to store power and the power supply further configured to provide power to the smart speaker; and a housing configured to house the at least one transceiver, the processor, and the power supply, wherein the housing is configured with a surface that is configured to receive the smart speaker, wherein the at least one transceiver is further configured to wirelessly connect to at least one wireless device and provide the internet access to the at least one wireless device, wherein the housing is configured with a cylindrical form factor having a diameter between 2 inches and 3 inches, wherein the housing further comprises one or more fastening structures and/or fastening components configured to hold the smart speaker to the housing, wherein the housing further comprises at least one of the following: a power outlet configured to receive a cable and the cable is configured to provide power to the smart speaker and an inductive coupling component configured to provide power to the smart speaker.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Reference in this disclosure to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Figure 1:
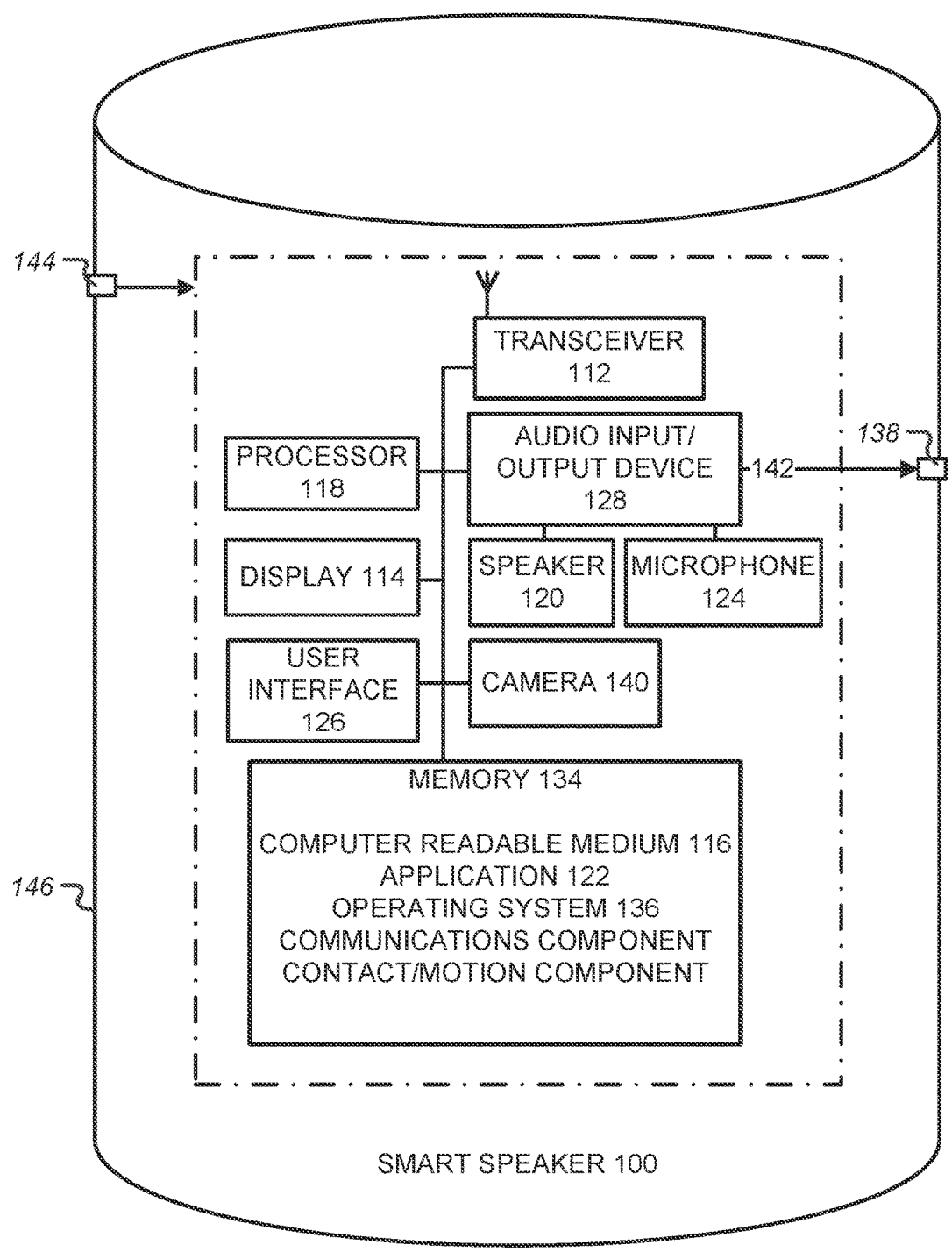
FIG. 1 illustrates a smart speaker device and its components, in accordance with aspects of the disclosure.

FIG. 1 illustrates a smart speaker device and its components, in accordance with aspects of the disclosure. FIG. 1 illustrates an exemplary aspect of a smart speaker 100. In accordance with some aspects of the disclosure, a smart speaker 100 may be a type of wireless speaker and voice command device that may include an integrated virtual assistant (artificial intelligence) that offers interactive actions and hands-free activation with the help of one "hot word" (or several "hot words"). In one or more aspects, the smart speaker 100 may also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. In one aspect, each can have its own designated interface and features in-house, usually launched or controlled via application or home automation software. In one aspect, the smart speaker 100 may also include a screen to show the user a visual response. The smart speaker 100 may include a transceiver 112, a computer readable medium 116, and a processor 118. The transceiver 112 can include, for example, a wireless antenna and associated circuitry capable of data transmission with at least one data transmission protocol, such as, for example, Wi-Fi, Bluetooth, a communication channel as defined herein, combinations thereof, and/or the like. The transceiver 112 may transmit and receive data utilizing the data transmission protocol. In one aspect, the processor 118 and/or the transceiver 112 may be implemented in a wireless device chipset. The transceiver 112 may connect to the Internet via Wi-Fi protocol to obtain data such as streaming music, Internet related data, and the like. The transceiver 112 may connect to other wireless devices via Bluetooth (or other communication channel as defined herein) to receive data such as streaming audio and the like. The transceiver 112 may connect to other wireless devices via Bluetooth (or other communication channel as defined herein) to provide data such as streaming audio and the like.

In one aspect, the smart speaker 100 may include a display 114. The display 114 of the smart speaker 100 may be configured to display various information provided to the display 114 from the processor 118 of the smart speaker 100, the computer readable medium 116, and/or an application 122. The display 114 may be one or more light-emitting diodes (LEDs) providing a color based output indicating a volume level of the speaker, connectivity to the Internet, a status of the smart speaker 100, and the like.

In other aspects, the display 114 may include a screen that may be a light-emitting diode display (LED), an electroluminescent display (ELD), a plasma display panel (PDP), a liquid crystal display (LCD), an organic light-emitting diode display (OLED), active-matrix organic light-emitting diode (AMOLED) display, IPS (In-plane switching) liquid crystal displays (LCDs), or any other display technology. The display 114 may display information. The information may be displayed simultaneously or the user may interact with an input device such as a touch-screen, with the icons on the display 114 to cycle through the various types of information for display. In operation, the display 114 may display various icons associated with applications for execution by the processor 118. In this regard, a user may touch the display 114 to interact with the icons. For example, touching an icon may execute an application in the processor 118 associated with the icon that is stored in the memory 134. Additionally or alternatively, touching an icon may open a menu of options to be selected by the user. The display 114 may include a plurality of the icons for the user to interact with. Moreover, the display 114 may include a plurality of screens. The display 114 showing one screen at a time. The user may interact with the display 114 to move a screen into view on the display 114. Various icons may be located in the each of the screens.

The computer readable medium 116 may store computer data, which may include computer program code that may be executable by the processor 118 of the smart speaker 100 in machine readable form. By way of example, and not limitation, the computer readable medium 116 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 116 or machine readable medium, which may be incorporated into a computer program product.

The processor 118 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), any other programmable logic device (PLD), or the like.

The smart speaker 100 may also be configured to connect to a wired power source that connects to an AC circuit that provides an AC voltage that may be converted to DC voltage for the smart speaker 100. The DC voltage for the smart speaker 100 may be input to a power receptacle 144 arranged on a housing 146 of the smart speaker 100. In one aspect, the power receptacle 144 may be configured as a USB, (Universal Serial Bus) type connector (e.g., type-A, type-B, mini/micro, type-C, and the like). In aspects described below, the smart speaker 100 may be implemented to not connect to a wired power source that connects to an AC circuit.

The smart speaker 100 may also include a memory 134, which may be an internal memory or a removable storage type such as a memory chip. Additionally, the smart speaker 100 may include an audio input/output device 128 for the input or output of audio and the like. In some aspects, the smart speaker 100 may include a speaker 120 that may be connected to the audio input/output device 128 for the output of audio, such as processor generated spoken words, music, and the like. In some aspects, the smart speaker 100 may include a microphone 124 that may be connected to the audio input/output device 128 for input of sounds that include or use your spoken commands. In some aspects, the smart speaker 100 may include a camera 140 for capturing images and may include video capturing capabilities. In some aspects, the audio input/output device 128 may include a connector 138 for the output of audio in processor generated spoken words, music, and the like. The connector 138 may be configured to provide a wired connection to a separate speaker, such as the speaker 220 described in conjunction with the access point and power supply 200 described below. The connector 138 may be connected to the audio input/output device 128 via a wire 142 or the like. In one aspect, the connector 138 may be a 3.5 mm (millimeter) female type receptacle providing stereophonic audio output and located on the housing 146.

The smart speaker 100 may also have a user interface 126 to facilitate use of the smart speaker 100 with an operating system 136. In this regard, the user interface 126 may include one or more physical buttons, knobs, and the like for the user to provide input to the smart speaker 100. In other aspects, the user interface 126 may be implemented as a touchscreen in conjunction with the display 114 as described above. The operating system 136 may be associated with a touchscreen controller, one or more communications components, one or more graphics components, one or more contact/motion components, and the like.

In one aspect, the smart speaker 100 may include voice recognition software stored in the memory 134 that may be utilized in various aspects of the systems and methods of the disclosure. Users may be able to vocalize input, rather than utilizing other input processes. For example, the voice recognition software may be configured for generating text from voice input from the microphone 124 or other voice input through the audio input/output device 128. The processor 118 or a separate speech signal processor may convert speech signals into digital data that can be processed by the processor 118. The processor 118 may perform several distinct functions, including serving as a speech event analyzer, a dictation event subsystem, a text event subsystem, and an executor of the application program. The speech signal processor may generate speech event data and transmit this data to the processor 118 to be processed first by the speech event analyzer. The speech event analyzer may generate a list or set of possible candidates among the system recordings that represent or match the voice input processed by the speech signal processor. The speech event analyzer may transmit the candidate sets to the dictation event subsystem. The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the smart speaker 100. In one aspect, the smart speaker 100 may include voice recognition software stored and executed separate from the smart speaker 100. For example, in one or more aspects the voice-recognition software may be cloud-based.

In one aspect, the smart speaker 100 may be implemented as an Amazon Dot smart speaker. The Amazon Dot is available from Amazon.com, Inc., Seattle, Wash., USA. In one aspect, the smart speaker 100 may be implemented as an Amazon Echo smart speaker. The Amazon echo is available from Amazon.com, Inc., Seattle, Wash., USA. In this regard, the processor 118 may be implemented as a Texas Instruments DM3725 ARM Cortex-A8 processor, the memory 134 may be implemented as 256 MB of LPDDR1 RAM and include 4 GB of storage space, the transceiver 112 may be implemented for dual-band Wi-Fi 802.11a/b/g/n and Bluetooth protocols, may include Advanced Audio Distribution Profile (A2DP) support for audio streaming, and may include an Audio/Video Remote Control Profile (AVRCP) for voice control of connected devices. In one aspect, the application 122 may include at least the voice recognition software. In some aspects, the smart speaker may use interactive voice response (IVR).

In another aspect, the smart speaker 100 may be implemented as a Google Home smart speaker. The Google Home is available from Google, Inc., Mountain View, Calif., USA. In this regard, the processor 118 may be implemented as an ARM processor. In this aspect, the application 122 may include the voice recognition software. In some aspects, the smart speaker may use IVR.

In another aspect, the smart speaker 100 may be implemented as an Apple HomePod smart speaker. The Apple HomePod is available from Apple Inc., Cupertino, Calif., USA. In one aspect, the smart speaker 100 may be implemented as an Amazon Echo Show. The Amazon Echo Show is available from Amazon.com, Inc., Seattle, Wash., USA.

Figure 2:
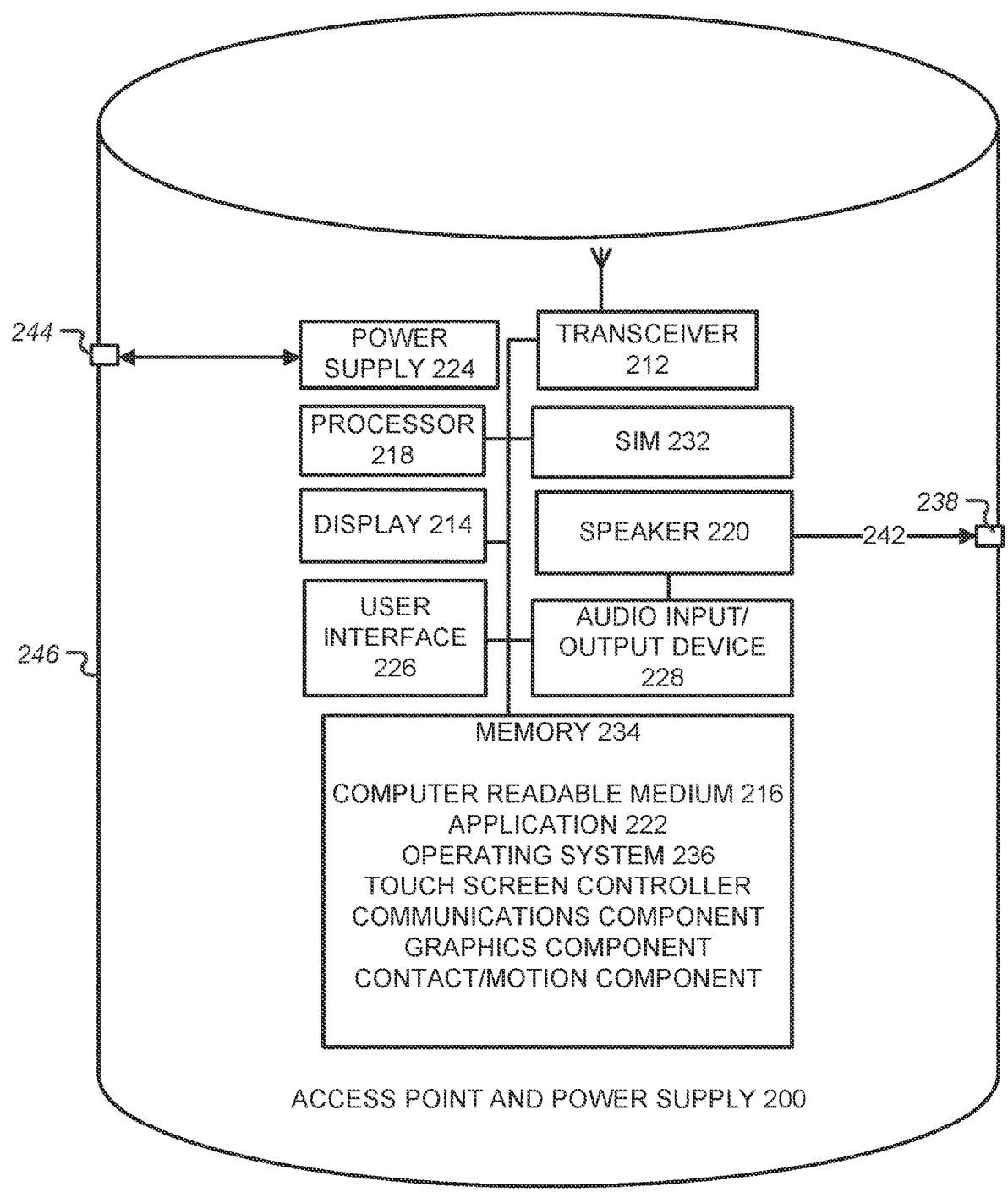
FIG. 2 illustrates an access point and power supply and its components, in accordance with aspects of the disclosure.

FIG. 2 illustrates an access point and power supply and its components, in accordance with aspects of the disclosure. In particular, FIG. 2 illustrates an exemplary aspect of the access point and power supply 200. The access point and power supply 200 may include a transceiver 212, a computer readable medium 216, and a processor 218. The transceiver 212 can include, for example, a wireless antenna and associated circuitry capable of data transmission with a mobile data network utilizing at least one data transmission protocol, such as, for example, 3G, 4G, LTE, 5G, Evolution-Data Optimized (EVDO), CDMA, High Speed Packet Access (HSPA), Global System for Mobile Communications (GSM), W-CDMA (Wideband Code-Division Multiple Access), Wi-Fi, Bluetooth, a communication channel as defined herein, combinations thereof, and/or the like. The transceiver 212 may transmit and receive data utilizing the data transmission protocol. In one aspect, the processor 218 and/or the transceiver 212 may be implemented in a wireless device chipset. In one aspect, the transceiver 212 is configured to provide a Wi-Fi hotspot functionality in conjunction with a wireless connection to a mobile broadband network as described in detail below.

The transceiver 212 may include a first transceiver and a second transceiver. The first transceiver can include, for example, a wireless antenna and associated circuitry capable of data transmission with a mobile data network utilizing at least one data transmission protocol, such as, for example, 3G, 4G Long Term Evolution (LTE), 5G (fifth generation), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The first transceiver transmits and receives data over the data transmission protocol with the mobile data network.

The second transceiver transmits to and receives data from the smart speaker 100. The second transceiver can include, for example, a wireless antenna and associated circuitry capable of data transmission over various data transmission protocols, such as, for example, Wi-Fi, Bluetooth, Near Field Communication (NFC), or some other communication channel as defined herein. The first transceiver and the second transceiver may be configured as separate devices or a single device.

In one aspect of the disclosure, the second transceiver may receive from the smart speaker 100, for example, a request to send data to the mobile data network. The second transceiver may receive this request in a modulated signal. The second transceiver then may demodulate this signal for further processing within the access point and power supply 200. The second transceiver formats this message into a protocol appropriate for transfer to the first transceiver. The first transceiver receives this message and modulates the message for further wireless transmission to the mobile data network. The first transceiver formats the message into an appropriate format for transmission to the mobile data network using a network data transmission protocol as described above, such as, for example, 4G LTE.

In another aspect of the disclosure, the first transceiver may receive data from the mobile data network with a destination for the smart speaker 100 connected to the access point and power supply 200. The first transceiver may demodulate the received message for further processing within the access point and power supply 200 via, for example, a bus. The first transceiver may format the message from the mobile data network into a format appropriate for transfer to the second transceiver. The second transceiver may receive this message. The second transceiver may modulate the received message for further wireless transmission to the smart speaker 100. The second transceiver may format the data into a format appropriate for transmission over the wireless protocol from the access point in power supply 200 using, for example, Wi-Fi, Bluetooth, Near Field Communication (NFC), or some other communication channel as defined herein to communicate with the smart speaker 100.

In one aspect, the access point and power supply 200 may include a display 214. The display 214 of the access point and power supply 200 may be configured to display various information provided to the display 214 from the processor 218 of the access point and power supply 200, computer readable medium 216, and/or an application 222. The screen may be a light-emitting diode display (LED), an electroluminescent display (ELD), a plasma display panel (PDP), a liquid crystal display (LCD), an organic light-emitting diode display (OLED), active-matrix organic light-emitting diode (AMOLED) display, IPS (In-plane switching) liquid crystal displays (LCDs), or any other display technology.

The displayed information can include, for example, an amount of prepaid wireless data service available, current battery status (percent power remaining, charging, etc.) the network connection strength, the type of mobile network data connection (such as 3G, 4G LTE, EVDO, etc.) the access point and power supply 200 is connected to, and/or other information potentially useful to the user. The information may be displayed simultaneously, or the user may interact with an input device such as a touch-screen, with the icons on the display 214 to cycle through the various types of information for display. In operation, the display 214 may display various icons associated with applications for execution by the processor 218. In this regard, a user may touch the display 214 to interact with the icons. For example, touching an icon may execute an application in the processor 218 associated with the icon that is stored in memory 234. Additionally or alternatively, touching an icon may open a menu of options to be selected by the user. The display 214 may include a plurality of the icons for the user to interact with. Moreover, the display 214 may include a plurality of screens. The display 214 showing one screen at a time. The user may interact with the display 214 to move a screen into view on the display 214. Various icons may be located in the each of the screens.

The computer readable medium 216 may store computer data, which may include computer program code that may be executable by the processor 218 of the access point and power supply 200 in machine readable form. By way of example, and not limitation, the computer readable medium 216 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 216 or machine readable medium, which may be incorporated into a computer program product.

The processor 218 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), any other programmable logic device (PLD), or the like.

The access point and power supply 200 includes a power supply 224. The power supply 224 may be a battery such as nickel cadmium, nickel metal hydride, lead acid, lithium ion, lithium ion polymer, and the like. The power supply 224 may provide power for operation of the access point and power supply 200. The power supply 224 may be charged by connection of a power outlet 244 to a separate rectifier/transformer circuit (not shown) that may be connected to an AC circuit that provides an AC voltage that may be converted to DC voltage by the rectifier/transformer circuit. The DC voltage from the rectifier/transformer circuit is then applied to the power supply 224. In other aspects, the access point and power supply 200 include the rectifier/transformer circuit therein. In one aspect, the power outlet 244 may be configured as a USB, (Universal Serial Bus) type the connector (e.g., type-A, type-B, mini/micro, type-C, and the like). The power outlet 244 may be arranged on a housing 246 of the smart speaker 100.

The power supply 224 may also be utilized to power the smart speaker 100 through the power outlet 244. Accordingly, the power supply 224 may power both the access point and power supply 200 and the smart speaker 100. In some aspects, the power outlet 244 may be a single connector receiving power to charge the power supply 224 and provide power from the power supply 224. In some aspects, the power outlet 244 may be a plurality of connectors, one connector receiving power to charge the power supply 224 and one connector providing power from the power supply 224.

The access point and power supply 200 may also include a memory 234, which may be internal memory or a removable storage type such as a memory chip. The memory 234 may store information about the access point and power supply 200, including wireless profiles and settings. In some aspects, the wireless profiles and settings may control operation of the access point and power supply 200. In one aspect, the access point and power supply 200 may include a listing of preferred Wi-Fi networks. Moreover, once the access point and power supply 200 recognizes that one of the preferred Wi-Fi networks is available and the smart speaker 100 could connect to one of those preferred Wi-Fi networks, the access point and power supply 200 may communicate this to the smart speaker 100 and the smart speaker 100 will connect to one of these preferred Wi-Fi networks. Alternatively, once the access point and power supply 200 recognizes that one of the preferred Wi-Fi networks is available and the smart speaker 100 could connect to one of those preferred Wi-Fi networks, the access point and power supply 200 may disable the transceiver 212 and the smart speaker 100 will automatically connect to one of these preferred Wi-Fi networks. In either case, this process reduces the consumption of data service for the access point and power supply 200.

Additionally, the access point and power supply 200 may include an audio input/output device 228 for the input or output of audio including music and the like. In some aspects, the access point and power supply 200 may include a speaker 220 that may be connected to the audio input/output device 228 for output of audio. In this regard, the transceiver 212 may connect via Bluetooth to the smart speaker 100 and receive audio via the Bluetooth protocol for generation of stereophonic audio sounds on the speaker 220. Other protocols based on a communication channel as defined herein are contemplated as well for transmitting audio. In some aspects, the speaker 220 may directly receive wired audio input for the generation of an output of audio. In this regard, the access point and power supply 200 may include a receptacle 238 that may be connected via a wire 242 to the speaker 220. The receptacle 238 may receive audio from the smart speaker 100 or any other source for generation of stereophonic audio sounds on the speaker 220. In one aspect, the receptacle 238 may be a 3.5 mm female type receptacle providing stereophonic audio input and located on the housing 246.

The access point and power supply 200 may use a subscriber identity module (SIM) card 232. The SIM 232 may vary in size and may be a micro, mini, nano size, or any size SIM 232. The SIM 232 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 232 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 232 may be identified by its ICCID. ICCIDs may be stored in the SIM cards. The ICCID is defined by the ITU-T recommendation E.118 as the Primary Account Number. The SIM 232 layout may be based on ISO/IEC 7812. In some aspects, the SIM 232 may also be a soft SIM, electronic SIM, or embedded SIM. In some aspects, the access point and power supply 200 may not use a SIM card 232. In some aspects, other memory locations of the access point and power supply 200 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

The access point and power supply 200 may also have a user interface 226 to facilitate use of the access point and power supply 200 with an operating system 236. The operating system 236 may be associated with a touchscreen controller, one or more communications components, one or more graphics components, one or more contact/motion components, and the like. The operating system 236 may be an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

In one aspect, the housing 246 of the access point and power supply 200 may be a fully enclosed structure. In one aspect, one or more portions of the housing 246 may be formed of synthetic material, such as plastic. In one aspect, one or more portions of the housing 246 may be formed of synthetic material, such as molded plastic. In one aspect, the housing 246 may include apertures for the receptacle 238 and the power outlet 244 to allow for connections thereto.

In one aspect, the housing 246 encloses at least the power supply 224 and the transceiver 212. In one aspect, the housing 246 encloses at least the power supply 224, the speaker 220, and the transceiver 212. In one aspect, the housing 246 encloses the components illustrated in FIG. 2. These aspects may be beneficial to increasing the portability of the access point and power supply 200. In this regard, if these components are separately provided, portability is reduced. Accordingly, the housing 246 enclosing one or more of the components illustrated in FIG. 2 provides a synergistic arrangement of components increasing portability and usability of the access point and power supply 200.

In one aspect, the housing 246 may be hermetically sealed to prevent intrusion of foreign objects. In one aspect, the housing 246 may be waterproof to prevent intrusion of water. In one aspect, the housing 246 may be watertight to prevent intrusion of water. In this regard, the housing 246 may include one or more seals, gaskets, adhesive, waterproof coating, potting materials, and the like. These aspects may be beneficial when utilizing the access point and power supply 200 in outdoor environments for protection thereof.

According to another aspect of the disclosure, the access point and power supply 200 and/or a network 402 may estimate the location of the access point and power supply 200 based, at least in part, on a global navigation satellite system (GNSS) with a location determination device. In another aspect, a network 402 may secure location determination based on a specific cell in which the access point and power supply 200 connects. In yet another aspect, a network 402 may obtain location determination based on triangulation with respect to a plurality of cells in which the access point and power supply 200 receives signals. Each of these approaches may be implemented with the location determination device. In one aspect, the location determination may be implemented to find a lost or stolen access point and power supply 200. In this aspect, a separate device may request a location of a lost or stolen access point and power supply 200, thereafter a mobile network may obtain location of the lost or stolen access point and power supply 200 utilizing the above-noted functionality, and provide the location of the lost or stolen access point and power supply 200 to the separate device.

According to another aspect of the disclosure, the access point and power supply 200 may be controlled by a wireless device application. In this regard, a separate wireless device may implement an application as defined herein to control various aspects of the access point and power supply 200. The various aspects may include Wi-Fi parameters including encryption types, Wi-Fi passwords, power supply control, volume of the speaker 220, and the like.

In certain aspects, the smart speaker 100 and/or the access point and power supply 200 may utilize Rich Communication Services (RCS) functionality. RCS is a communication protocol between mobile-telephone carriers and between phone and carrier, aiming at replacing SMS messages with a text-message system that is more rich, provide phonebook polling (for service discovery), and transmit in-call multimedia. RCS combines different services defined by 3rd Generation Partnership Project (3GPP) and Open Mobile Alliance (OMA) with an enhanced phonebook.

The following standardized services are a part of the specifications of RCS: Standalone Messaging, 1-to-1 Chat, Group Chat, File Transfer, Content Sharing, Social Presence Information, IP Voice call, Best Effort Video call, Geolocation Exchange, Audio Messaging, Network based blacklist, Capability Exchange based on Presence or SIP OPTIONS, and the like.

In some aspects, the RCS may be implemented at least in part in an application executed by the processor 118 of the smart speaker 100. In some aspects, the RCS may be implemented at least in part in an application executed by the processor 218 of the access point and power supply 200. In some aspects, the RCS may be implemented at least in part in an application executed by the processor 118 of the smart speaker 100 and at least in part in an application executed by the processor 218 of the access point and power supply 200. In some aspects, the RCS may be implemented at least in part in an application executed by the processor 118 of the smart speaker 100, at least in part in an application executed by the processor 218 of the access point and power supply 200, and at least in part in an application executed by a processor of a separate wireless device.

Figure 3:
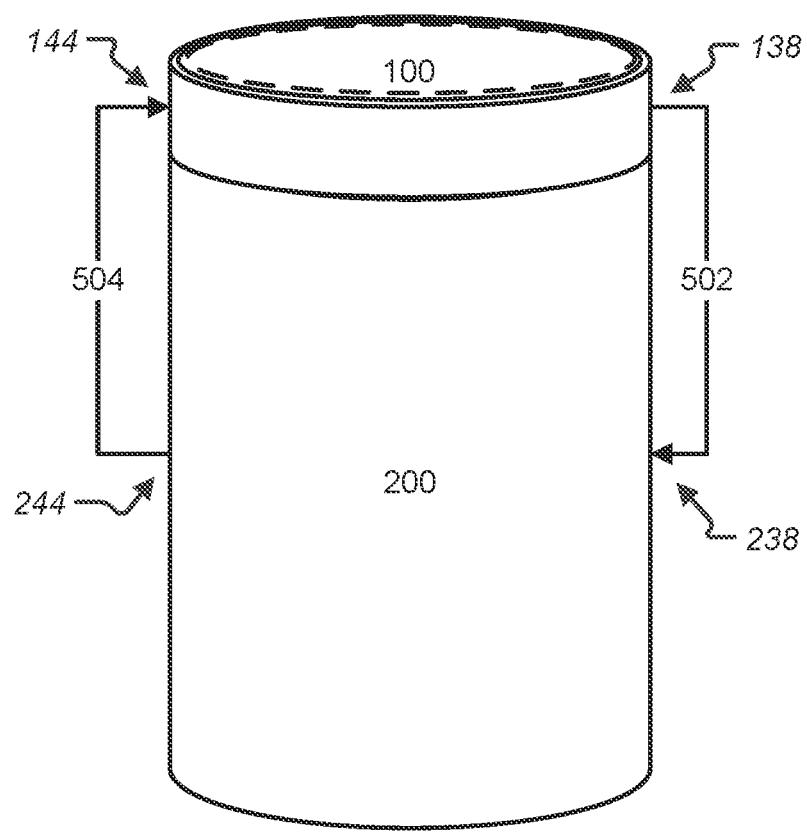
FIG. 3 illustrates an exemplary implementation of a smart speaker device and an access point and power supply in accordance with aspects of the disclosure.

FIG. 3 illustrates an exemplary implementation of a smart speaker device and an access point and power supply in accordance with aspects of the disclosure. In particular, FIG. 3 illustrates the smart speaker 100 operationally connected to the access point and power supply 200 to provide power to the smart speaker 100. In particular, a cable 504 may connect to the power outlet 244 of the access point and power supply 200. As noted above, the power outlet 244 connects to and receives power from the power supply 224. The cable 504 may further be connected to the power receptacle 144 of the smart speaker 100. In this arrangement, the access point and power supply 200 may provide power to the smart speaker 100 from the power supply 224, through the power outlet 244, through the cable 504, and may be input to the power receptacle 144 to power the smart speaker 100. In another aspect, the access point and power supply 200 may provide power to the smart speaker 100 through a direct connection without the cable 504. For example, the access point and power supply 200 may provide power in a female connector that connects to the associated male connector on the smart speaker 100. Other types of connectors are contemplated as well. Arranging the smart speaker 100 on the access point and power supply 200 may effectuate the connection between the two to provide power. In another aspect, the access point and power supply 200 may provide power to the smart speaker 100 via an induction circuit. In this regard, the access point and power supply 200 may use an electromagnetic field to transfer energy to the smart speaker through electromagnetic induction. In particular, the access point and power supply 200 may provide power through an inductive coupling to the smart speaker to power the same. The access point and power supply 200 may use an induction coil to create an alternating electromagnetic field, and a second induction coil in the smart speaker 100 takes power from the electromagnetic field and converts it back into electric current to operate. The two induction coils in proximity combine to form an electrical transformer.

FIG. 3 further illustrates that the smart speaker 100 may be operationally connected to the access point and power supply 200 to receive audio from the smart speaker 100. In particular, a cable 502 may connect to the receptacle 238 of the access point and power supply 200 to provide audio thereto. The cable 502 may further be connected to the connector 138 of the smart speaker 100 to receive audio therefrom. In this arrangement, the access point and power supply 200 may receive audio from the smart speaker 100 through the connector 138, through the cable 502 and be input to the receptacle 238. Thereafter, the speaker 220 of the access point and power supply 200 may generate audio based on the audio signal from the smart speaker 100. In other aspects, the access point and power supply 200 may receive audio from the smart speaker 100 wirelessly. In this aspect, the smart speaker 100 may transmit audio wirelessly via Wi-Fi, Bluetooth or Near Field Communication (NFC) protocols via the transceiver 112; and the access point and power supply 200 may receive audio from the smart speaker 100 wirelessly using the same communication protocols via the transceiver 212.

Figure 4:
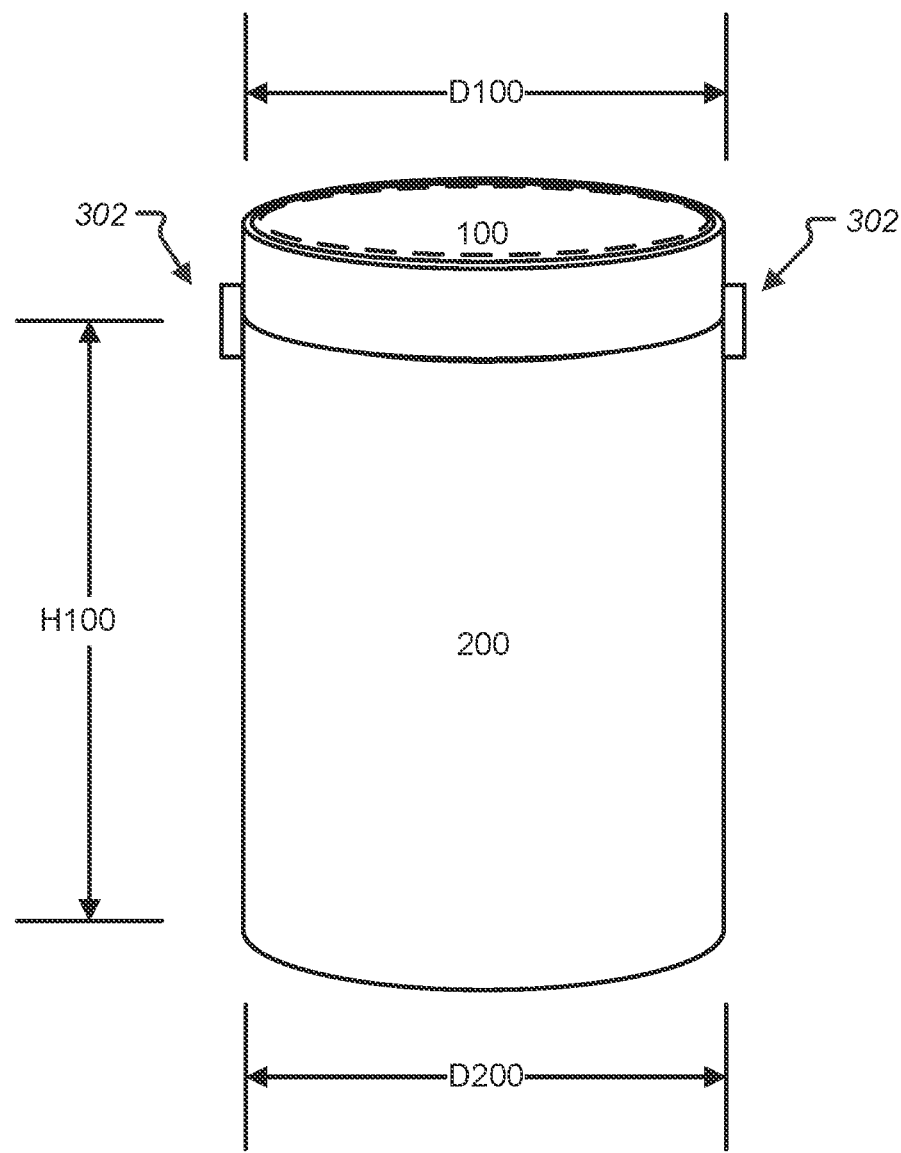
FIG. 4 illustrates an exemplary form factor of a smart speaker device and an access point and power supply in accordance with aspects of the disclosure.

FIG. 4 illustrates an exemplary form factor of a smart speaker device and an access point and power supply in accordance with aspects of the disclosure. In one or more aspects of the disclosure, the smart speaker 100 and the access point and power supply 200 may have a consistent form factor in one or more dimensions. In this regard, the access point and power supply 200 may have a form factor such that it supports the smart speaker 100 on a surface thereof. In one aspect, the access point and power supply 200 may have a form factor such that it supports the smart speaker 100 on an upper surface thereof as illustrated in FIG. 4. In one aspect, the access point and power supply 200 may have a diameter as shown by the arrow D200 that is approximately the same as a diameter of the smart speaker 100 as shown by the arrow D100. In one aspect, the access point and power supply 200 may have a diameter as shown by the arrow D200 that is greater than a diameter of the smart speaker 100 (not shown). In one aspect, the access point and power supply 200 may have a diameter as shown by the arrow D200 that is less than a diameter of the smart speaker 100 (not shown).

In one aspect, the access point and power supply 200 may have a cylindrical form factor. In this aspect, the cylindrical form factor may be 1-6 inches in height and 3-4 inches in diameter. In one aspect, the cylindrical form factor may be 3-5 inches in height and 3-4 inches in diameter as shown by arrow H200. In one aspect, the cylindrical form factor may be 1-6 inches in height and 3.1-3.6 inches in diameter. In one aspect, the cylindrical form factor may be 1-6 inches in height and 3.2-3.4 inches in diameter.

In one aspect, the access point and power supply 200 may have a cylindrical form factor sized to fit a cupholder in an automobile. In one aspect, the cylindrical form factor may be 1-6 inches in height and 2-3 inches in diameter. In one aspect, the cylindrical form factor may be 1-6 inches in height and 2.25-2.75 inches in diameter. In this aspect, a user may place the access point and power supply 200 in their automobile cupholder and arrange the smart speaker 100 thereon. This construction provides a secure location for the access point and power supply 200 and smart speaker 100 as well as being located within a usable range for the driver and/or passengers.

In one aspect, the access point and power supply 200 may have a rectangular form factor. In this aspect, the rectangular form factor may be 1-6 inches in height and 6-8 inches in length and 3-4 inches in width. In this aspect, the rectangular form factor may be 1-6 inches in height and 7-8 inches in length and 3-4 inches in width.

In one aspect, the access point and power supply 200 may include fastening structure and/or fastening components 302 to fasten to the smart speaker 100. In this regard, the fastening structure and/or fastening components 302 may securely connect the access point and power supply 200 and the smart speaker 100 together such that they may be easily transported and/or have increased portability. The fastening structure and/or fastening components 302 may include clips, clamps, mechanical fasteners, temporary adhesive, Velcro™, straps, a magnetic component (magnet arranged on one component and a Ferris material arranged on the other components), and the like on either or both the access point and power supply 200 and the smart speaker 100. In one aspect, the fastening structure and/or fastening components 302 may include clips that are molded into the housing 246 of the access point and power supply 200 and configured to clip to the smart speaker 100 and maintain the smart speaker 100 in a secure manner.

Figure 5:
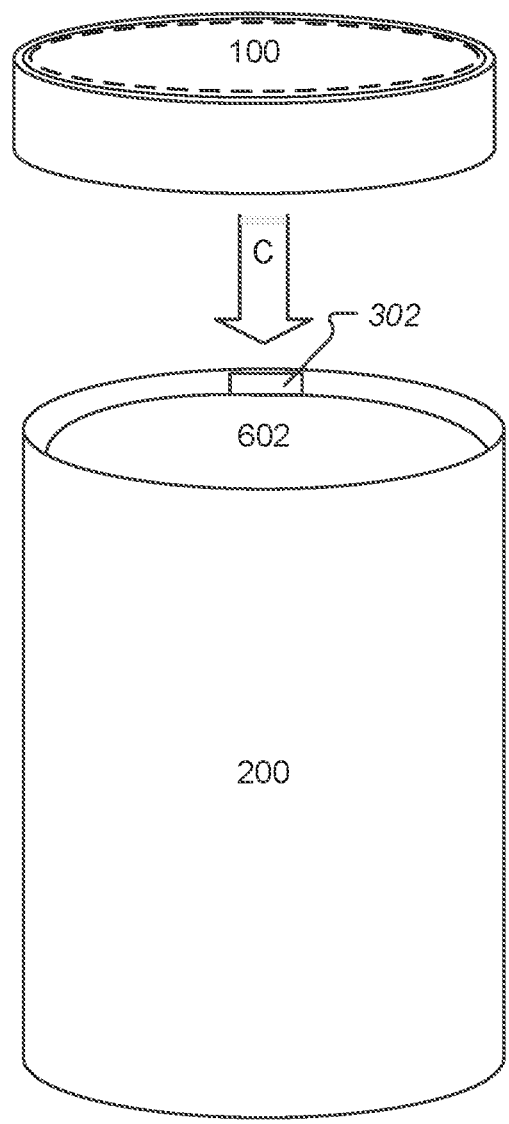
FIG. 5 illustrates an exemplary implementation of a smart speaker device and an access point and power supply in accordance with aspects of the disclosure.

FIG. 5 illustrates an exemplary implementation of a smart speaker device and an access point and power supply in accordance with aspects of the disclosure. In one aspect, the access point and power supply 200 may include a recessed surface 602 arranged on the housing 246 of the access point and power supply 200 and configured to receive the smart speaker 100 and maintain the smart speaker 100 in a secure manner. In one aspect, the recessed surface 602 may be molded into the housing 246 of the access point and power supply 200. In one aspect, the recessed surface 602 may further include one or more fastening structures and/or fastening components 302 as described above.

Figure 6:
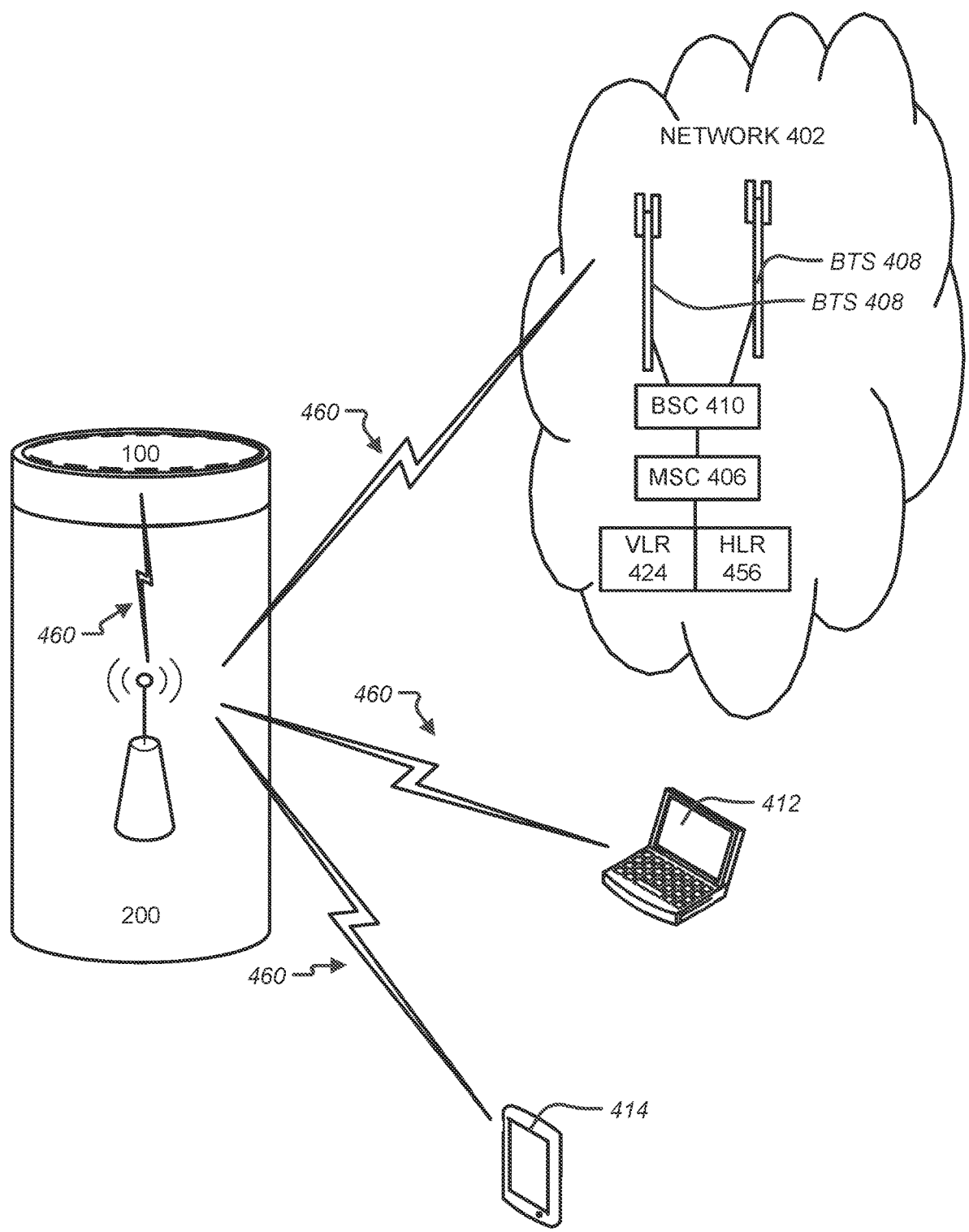
FIG. 6 illustrates a system implementing a smart speaker device and an access point and power supply in conjunction with a wireless network, in accordance with aspects of the disclosure.

FIG. 6 illustrates a system implementing a smart speaker device and an access point and power supply in conjunction with a wireless network, in accordance with aspects of the disclosure. In particular, FIG. 6 shows a network 402 that may provide wireless broadband data to the access point and power supply 200. The network 402 may include a Mobile services Switching Center (MSC) 406 that may include a Visitor Location Register (VLR) 424. The network 402 may also include a Base Transceiver Station (BTS) 408 and a Base Station Controller (BSC) 410. The base transceiver station 408 houses the radio transceivers that define a cell and handle the radio-link protocols with the access point and power supply 200. The base station controller 410 manages the radio resources for one or more base transceiver stations 408. The base station controller 410 is the connection between the access point and power supply 200 and the Mobile service Switching Center (MSC) 406. A Home Location Register (HLR) 456 and the VLR 424 together with the MSC 406, provide the wireless broadband capabilities. The HLR 456 contains all the administrative information of each subscriber registered in the corresponding network 402, along with the current location of the access point and power supply 200. The description of network 402 is merely exemplary. The network 402 may be implemented utilizing other known mobile broadband technologies.

In further aspects, the access point and power supply 200 may operate to provide a wireless hotspot for other wireless devices as well. For example, as shown in FIG. 6, the access point and power supply 200 may provide a Wi-Fi hotspot for various electronic devices such as a laptop 412 and a mobile phone 414. In further aspects, the access point and power supply 200 may operate to provide a wireless hotspot for other wireless devices as well utilizing tethering.

Figure 7:
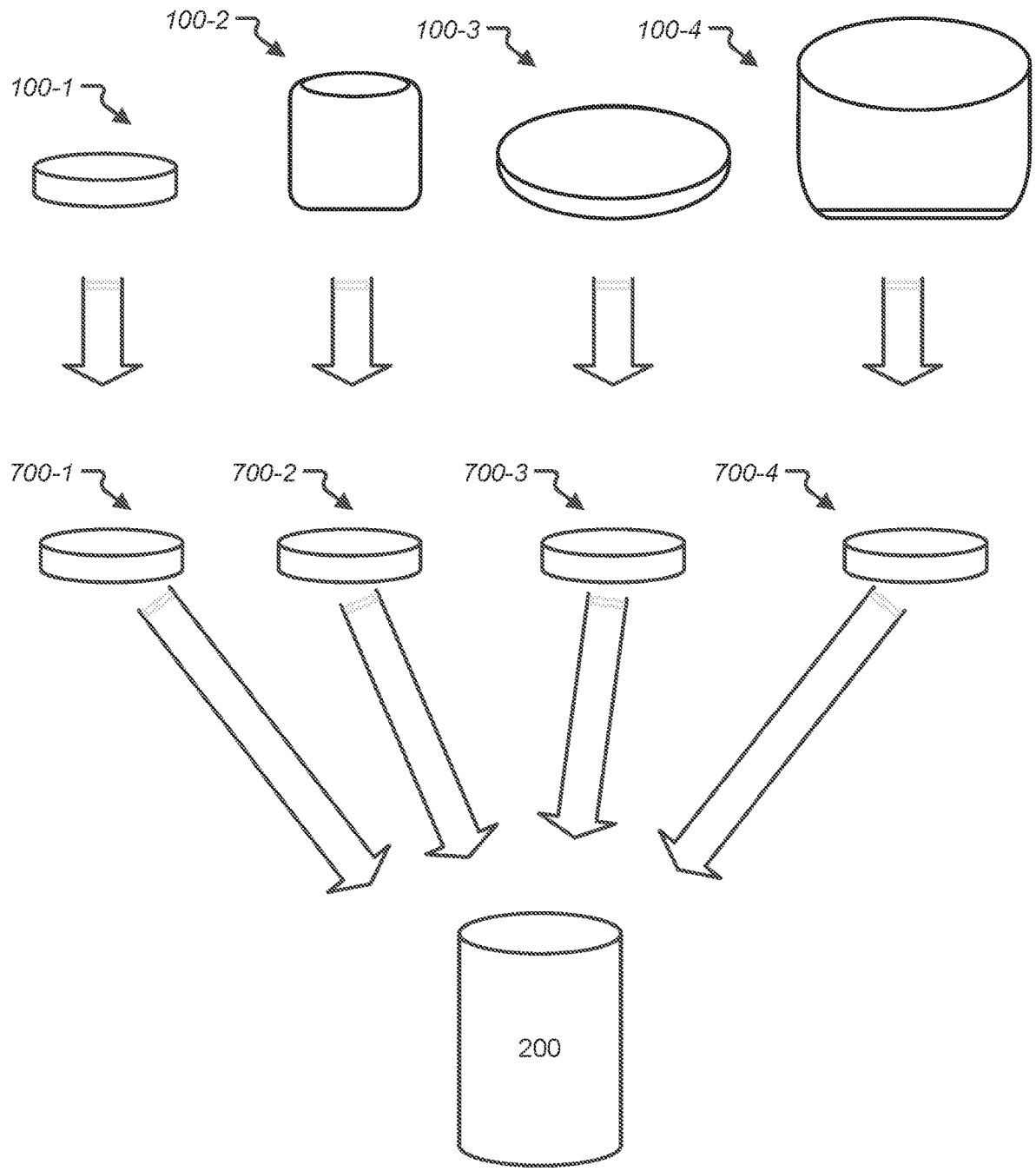
FIG. 7 illustrates another exemplary implementation of a smart speaker device and an access point and power supply in accordance with aspects of the disclosure.

FIG. 7 illustrates another exemplary implementation of a smart speaker device and an access point and power supply in accordance with aspects of the disclosure. In particular, the access point and power supply 200 may be configured with a number of features to connect or receive a number of different types of smart speakers 100. In this regard, smart speakers 100 are manufactured from a number of different manufacturers and may have a number of different form factors. Accordingly, a portion of the access point and power supply 200 may be configured to receive and/or connect to any number of different smart speakers 100. FIG. 7 illustrates various exemplary form factors of smart speakers 100 including a smart speaker 100-1, a smart speaker 100-2, a smart speaker 100-3, and a smart speaker 100-4. Of course, any form factor is contemplated.

In further aspects, the access point and power supply 200 may include an adapter 700 or a plurality of adapters 700 for connecting with various form factors of smart speaker 100. In one aspect, a smart speaker 100-1 may include a corresponding adapter 700-1 specifically structured and arranged to receive and connect to the smart speaker 100-1 as well as being structured and arranged to connect to the access point and power supply 200. Likewise, smart speaker 100-2, 100-3, and 100-4 may include a corresponding adapter 700-2, 700-3, and 700-4 that may each be specifically structured and arranged to receive and connect to a respective smart speaker 100-2, 100-3, and 100-4 as well as being structured and arranged to connect to the access point and power supply 200. Accordingly, the access point and power supply 200 may be sold and implemented with a number of different adapters in order to be associated with a number of different smart speakers.

Thus, the disclosure has described a device and process for powering smart speakers and providing internet connectivity for the same so that the smart speaker may be portable.

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

The disclosure may include communication channels 460 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), 4G, 5G, EVolution-Data Optimized (EVDO) and/or the like, and/or a combination of two or more thereof.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and the like, with wired/wireless communications capabilities via the communication channels 460.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term data as utilized herein includes mobile broadband or wireless Internet access delivered through mobile phone towers over a communication channel as defined herein to the access point and power supply 200, as well as computers, mobile phones, wireless devices, and other digital devices as defined herein using portable modems. Some mobile services allow more than one device to be connected to the Internet using a single cellular connection using a process called tethering.

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNOs) that maintain and control their own wireless networks. An MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In some aspects, the MVNO may utilize a plurality MNOs or wireless carriers. In some aspects, the MVNO may implement a plurality virtual network and/or virtual wireless carriers as a plurality of service offerings. In this regard, both MNOs and MVNOs may benefit from the disclosed system, method, and process associated with the access point and power supply 200.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A device configured to provide wireless service and power for a smart speaker, the device comprising:
   at least one transceiver configured to wirelessly connect to a mobile broadband network and further configured to obtain internet access from the mobile broadband network;
   a power supply comprising at least one battery and/or a circuit configured to connect to a wired power source, the power supply being configured to provide power to the at least one transceiver; and
   a housing configured to house the at least one transceiver and the power supply,
   wherein the at least one transceiver is further configured to wirelessly connect to the smart speaker utilizing Wireless Fidelity (Wi-Fi);
   wherein the at least one transceiver is further configured to provide the internet access to the smart speaker obtained from the mobile broadband network;
   wherein the power supply is further configured to provide power to the smart speaker;
   wherein the at least one transceiver is further configured to generate a Wireless Fidelity hotspot configured to wirelessly connect to the smart speaker and provide the internet access to the smart speaker obtained from the mobile broadband network;
   wherein the at least one transceiver is further configured to receive from the smart speaker a request to send data to the mobile broadband network, process the data, and transmit the data to the mobile broadband network; and
   wherein the at least one transceiver is further configured to receive data from the mobile broadband network with a destination for the smart speaker, process the data, and transmit the data to the smart speaker.

2. A system comprising the device of claim 1, and further comprising the smart speaker and the smart speaker comprises at least a processor, a speaker, a microphone, and a transceiver,
   wherein the processor is configured to implement and provide voice recognition of audio received by the microphone.

3. The system of claim 2, wherein the smart speaker comprises a display, the display comprising a touchscreen.

4. The system of claim 2, wherein the smart speaker comprises a camera, wherein the camera is configured to capture video.

5. The device of claim 1, further comprising an inductive coupling component configured to provide power from the power supply to the smart speaker.

6. The device of claim 1, wherein the housing further comprises:
   a surface configured to connect the smart speaker to the housing.

7. The device of claim 1, wherein:
   the housing further comprises a power outlet configured to connect to a cable to provide power from the power supply to the smart speaker; and
   the housing is configured to be waterproof to prevent intrusion of water.

8. The device of claim 1, wherein the housing is configured with a surface that is configured to receive the smart speaker.

9. The device of claim 1, further comprising an adapter configured to connect the smart speaker to the housing, wherein the housing further comprises a power outlet configured to receive a cable to provide power from the power supply to the smart speaker.

10. The device of claim 1, further comprising a display configured to display information comprising at least one of the following: a current battery status, a network connection strength, prepaid wireless data service available, and a type of mobile network data connection.

11. The device of claim 1, wherein:
   the housing is configured with a cylindrical form factor; and
   the housing is configured to be hermetically sealed to prevent intrusion of foreign objects.

12. The device of claim 1, further comprising a speaker configured to receive audio from the smart speaker via an audio connection,
   wherein the audio connection comprises at least one of the following: a wired connection implemented with an audio receptacle and a wireless connection implemented with the at least one transceiver.

13. A device configured to provide wireless service and power for a smart speaker, the device comprising:

at least one transceiver configured to wirelessly connect to a mobile broadband network and further configured to obtain internet access from the mobile broadband network;

a processor configured to control the at least one transceiver;

a power supply comprising at least one one battery and/or a circuit configured to connect to a wired power source, the power supply being configured to provide power to the at least one transceiver; and a housing configured to house the at least one transceiver, the processor, and the power supply, wherein the at least one transceiver is further configured to wirelessly connect to the smart speaker utilizing Wireless Fidelity (Wi-Fi) and provide the internet access to the smart speaker obtained from the mobile broadband network;

wherein the power supply is further configured to store power and the power supply further configured to provide power to the smart speaker;

wherein the at least one transceiver is further configured to generate a Wireless Fidelity hotspot to wirelessly connect to the smart speaker and provide the internet access to the smart speaker obtained from the mobile broadband network;

wherein the at least one transceiver is further configured to receive from the smart speaker a request to send data to the mobile broadband network, process the data, and transmit the data to the mobile broadband network; and wherein the at least one transceiver is further configured to receive data from the mobile broadband network with a destination for the smart speaker, process the data, and transmit the data to the smart speaker.

14. A system comprising the device of claim 13, and further comprising the smart speaker and the smart speaker comprises at least a processor, a speaker, a microphone, and a transceiver, wherein the processor is configured to implement and provide voice recognition of audio received by the microphone.

15. The system comprising of claim 14, wherein the smart speaker comprises a display, the display comprising a touchscreen.

16. The device of claim 13, wherein:
the housing is configured with a surface that is configured to receive the smart speaker; and
the housing is configured to be waterproof to prevent intrusion of water.

17. The device of claim 13, wherein:
the housing further comprises a surface configured to hold the smart speaker to the housing; and
the housing further comprises a power outlet configured to connect to a cable to provide power from the power supply to the smart speaker.

18. The device of claim 13, further comprising an adapter configured to have a form factor corresponding to the smart speaker,
wherein the adapter is structured and arranged to connect the smart speaker to the housing; and
wherein the housing further comprises at least one of the following: a power outlet configured to provide power from the power supply to the smart speaker and an inductive coupling component configured to provide power to the smart speaker.

19. The device of claim 13 further comprising a display configured to display information comprising at least one of the following: a current battery status, a network connection strength, prepaid wireless data service available, and a type of mobile network data connection.

20. The device of claim 13, wherein:
the housing is configured with a cylindrical form factor; and
the housing is configured to be waterproof to prevent intrusion of water.

* * * * *